(12) United States Patent
Matsubara et al.

(10) Patent No.: US 7,679,807 B2
(45) Date of Patent: Mar. 16, 2010

(54) DISPLAY MEDIUM, DISPLAY DEVICE AND DISPLAY METHOD

(75) Inventors: Takashi Matsubara, Kanagawa (JP); Kazunori Anazawa, Kanagawa (JP); Yuka Ito, Kanagawa (JP); Minquan Tian, Kanagawa (JP); Shinji Hasegawa, Kanagawa (JP); Kazuhiko Hirokawa, Kanagawa (JP); Makoto Furuki, Kanagawa (JP); Kazunaga Horiuchi, Tokyo (JP); Tomoko Miyahara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 190 days.

(21) Appl. No.: 12/038,035

(22) Filed: Feb. 27, 2008

(65) Prior Publication Data
US 2008/0278797 A1  Nov. 13, 2008

(30) Foreign Application Priority Data
May 9, 2007  (JP) .............................. 2007-124885

(51) Int. Cl.
G02F 1/15 (2006.01)
(52) U.S. Cl. .................................................. 359/265
(58) Field of Classification Search ......... 359/265–275; 345/105, 107
See application file for complete search history.

(56) References Cited

U.S. PATENT DOCUMENTS

| 6,573,115 B2 * | 6/2003 | Kwak et al. ................... 438/30 |
| 7,423,701 B2 * | 9/2008 | Nakayoshi et al. ............ 349/38 |
| 2006/0272948 A1 | 12/2006 | Yamamoto et al. |

FOREIGN PATENT DOCUMENTS

| JP | 2000-338528 A | 12/2000 |
| JP | 2005-092183 A | 4/2005 |
| JP | 2007-011260 A | 1/2007 |

\* cited by examiner

Primary Examiner—Ricky L Mack
Assistant Examiner—Tuyen Q Tra
(74) Attorney, Agent, or Firm—Sughrue Mion, PLLC

(57) ABSTRACT

A display medium includes: a first substrate having transparency and provided with a transparent electrode on one face thereof, a member having a plurality of penetration holes, the member being placed on a surface of the transparent electrode, the penetration holes penetrating the member from the transparent electrode surface side, the ratio of the length of each of the penetration holes to the largest hole diameter being two or more; a second substrate placed so as to face the transparent electrode side of the first substrate; an electrolytic solution containing a metal ion and placed so as to fill a space between the first and second substrates; and a counter electrode placed in a position so as to be insulated from the transparent electrode and in contact with the electrolytic solution.

10 Claims, 9 Drawing Sheets

DISPLAY MEDIUM, DISPLAY DEVICE AND DISPLAY METHOD

CROSS-REFERENCE TO RELATED APPLICATIONS

This application is based on and claims priority under 35 USC 119 from Japanese Patent Application No. 2007-124885 filed May 9, 2007.

BACKGROUND

1. Technical Field

The present invention relates to a display medium, a display device and a display method.

2. Related Art

As repeatedly rewritable display media, a display medium implementing display by rotating particles each painted in two different colors, a display medium making use of electrophoresis of particles, and a display medium utilizing a liquid crystal having a memory property have been known.

On the other hand, taking into account that display media utilizing the above described techniques are utilized in applications such as electronic paper, black and white display is basically most important, while it is also important that color display can be made for looking more attractive and enabling more colorful display.

SUMMARY

According to an aspect of the invention, there is provided a display medium, including: a first substrate having transparency and provided with a transparent electrode on one face thereof; a member having a plurality of penetration holes, the member being placed on a surface of the transparent electrode, the penetration holes penetrating the member from the transparent electrode surface side, the ratio of the length of each of the penetration holes to the largest hole diameter being two or more; a second substrate placed so as to face the transparent electrode side of the first substrate; an electrolytic solution containing a metal ion and placed so as to fill a space between the first and second substrates; and a counter electrode placed in a position so as to be insulated from the transparent electrode and in contact with the electrolytic solution.

BRIEF DESCRIPTION OF THE DRAWINGS

Exemplary embodiments of the present invention will be described in detail based on the following figures, wherein.

DETAILED DESCRIPTION (Display Method)

Figure 1:
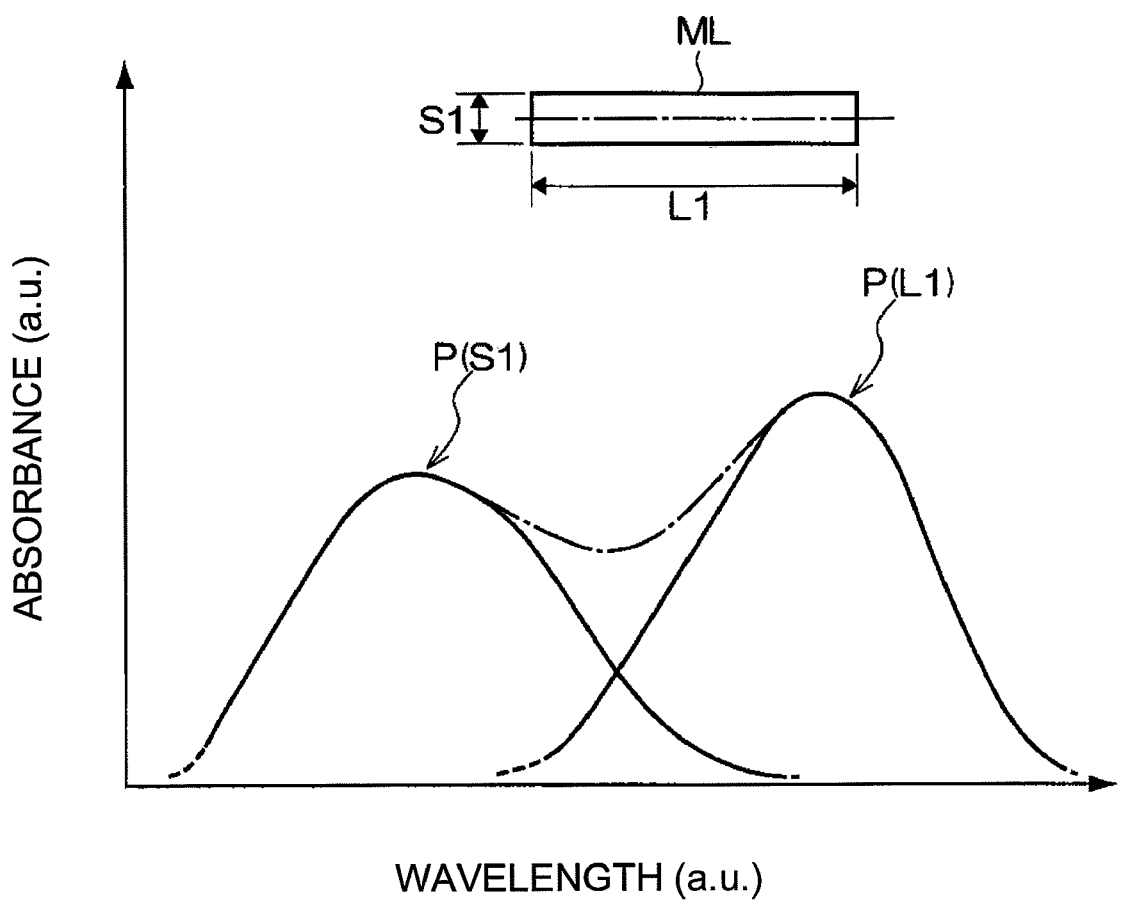
FIG. 1 shows a graph indicating one example of a typical absorption spectrum of a columnar metal oriented randomly.

A display method of an exemplary embodiment includes displaying an image through depositing a metal in a penetration hole in a member having a plurality of penetration holes, the member being placed on a surface of a transparent electrode of a substrate and in contact with an electrolytic solution containing a metal ion, the substrate having transparency and provided with the transparent electrode on one face thereof, the penetration holes penetrating the member from the transparent electrode surface side, the ratio of the length of each of the penetration holes to the largest hole diameter being two or more, by at least applying an electric field for reducing the metal ion to the electrolytic solution via the transparent electrode. Hereinafter, a value calculated by setting the length in the width direction such as the largest hole diameter to be the denominator and the length in the length direction such as the length of a penetration hole to be the numerator may be referred to as an "aspect ratio".

When the above-mentioned metal deposition is carried out, a metal ion in the electrolytic solution is reduced and a metal is deposited in the penetration hole, and the metal deposited in the penetration hole grows in the axis direction of the penetration hole to become a columnar metal particle (hereinafter, referred to as a "columnar metal" in some cases) as the deposition proceeds. Herein, a "columnar metal" means metal particle(s) in which the ratio (aspect ratio) of the length in the axis direction to the largest diameter is more than 1. Furthermore, in consideration of description, for the clarification of the difference from a "columnar metal", metal particle(s) with an aspect ratio of 1 is sometimes referred to as a "spherical metal".

Accordingly, a metal ion in an electrolytic solution is reduced and a columnar metal is deposited in a penetration hole while the aspect ratio is controlled, whereby the absorption wavelength of the columnar metal may be changed according to the aspect ratio. Moreover, a columnar metal once deposited is oxidized and the columnar metal is dissolved while the aspect ratio is controlled, whereby the absorption wavelength of the columnar metal may be changed according to the aspect ratio.

In addition, if the deposition density of metal particles deposited per area is the same, the case where a columnar metal is deposited provides a larger amount of metal contributing to coloring per area, as compared to the case where a spherical metal is deposited. As such, the display method of the exemplary embodiment may provide a larger coloring density (a larger amount of absorption of light with a specified wavelength) as compared with the conventional technique in which a metal ion in an electrolytic solution is deposited for displaying.

Although it is needed for the aspect ratio of a penetration hole to be two or more, from the viewpoint that the enlargement of the aspect ratio of a columnar metal deposited may provide a higher coloring density, the aspect ratio may be specifically 10 or more, and more specifically 15 or more. If the aspect ratio of a penetration hole is less than two, the aspect ratio of a metal deposited in a penetration hole is also small, so a larger coloring density is not obtained.

On the other hand, although the upper limit of the aspect ratio of a penetration hole is not particularly limited, practically the ratio may be 30 or less.

A penetration hole is formed from the transparent electrode surface side to one direction in a member having a plurality of penetration holes, for example, so as to linearly penetrate the member. Herein, the angle between the central axis of a penetration hole (hereinafter, referred to as a "hole axis") and the transparent electrode surface is not particularly limited so long as the angle is in the range of from greater than 0 degrees to less than 180 degrees. All of the penetration holes may be oriented in a same one direction, or may be oriented in different directions to each other; a part of all the penetration holes may be oriented in one direction and another part of them may be oriented in another direction. The deposition of a columnar metal by use of a penetration hole may allow controlling the shape and size of a columnar metal deposited, whereby more desirable display may be easily carried out. For instance, if each shape and size of a columnar metal deposited is made to be substantially the same, the peak position of the absorption wavelength is also substantially the same, whereby pure coloration may be obtained.

The cross sectional shape in a direction perpendicular to the hole axis direction of the penetration hole is not particularly limited and may be made to be an arbitrary shape such as a circle, an ellipse or a polygon such as a square, and specifically may be a circle. Additionally, the ratio (aspect ratio) of the larger diameter to the smaller diameter in the cross sectional shape in a direction perpendicular to the hole axis direction of the penetration hole may be in the range of from 1 to 2, and specifically may be 1. When the ratio is 1, with respect to the absorption wavelength attributable to the bottom portion of the columnar metal, the wavelengths of the larger and smaller diameters of the bottom are the same.

Hereinafter, in consideration of description, unless otherwise stated, description will be given on condition that the cross sectional shape in a direction perpendicular to the hole axis direction of the penetration hole is a circle; however, in the invention the cross sectional shape in a direction perpendicular to the hole axis direction of the penetration hole is by no means limited to only a circle.

Herein, the average hole diameter of the penetration hole is not particularly limited and may be within the range of from 1 nm to 1 µm. However, in particular, from the viewpoint that display making use of color due to surface plasmon resonance of a metal may be carried out, although depending on the kind and composition of a metal deposited within the penetration hole, the average hole diameter may be specifically within the range of from 1 nm to 100 nm, more specifically within the range of from 3 nm to 70 nm. Additionally, in the case where the cross sectional shape in a direction perpendicular to the hole axis direction of the penetration hole is a shape other than a circle such as an ellipse or a polygon, the hole diameter of the penetration hole means the diameter of a circle having an area equivalent to the area of the shape other than a circle.

From the viewpoint of sureness of clear coloring, with respect to the hole diameter distribution of the penetration hole, the hole diameter distribution index value D represented by equation (1) below may be 0.5 or less, specifically 0.4 or less, more specifically 0.3 or less, and still more specifically 0 (i.e., monodispersion), in at least a member having a plurality of penetration holes disposed so as to correspond to a specific region of the transparent electrode surface.

$$\text{Hole diameter distribution index value } D = Ps(\pm 30)/Ps(T) \quad \text{Equation (1)}$$

wherein $Ps(T)$ means the largest peak height in a maximum peak in the hole diameter distribution and $Ps(\pm 30)$ means a peak height of the hole diameter within ±30% of the diameter having the largest peak height in a maximum peak in the hole diameter distribution, in the hole diameter distribution of the penetration holes present in a member having a plurality of penetration holes disposed so as to correspond to a specific region.

The above "specific region" is not particularly limited so long as it is a continuous region having a constant area, and may be the entire region in which a member that has a plurality of penetration holes is placed on the transparent electrode surface placed on the substrate. However, usually, the "specific region" means a part of the entire region in which a member that has a plurality of penetration holes is placed on the transparent electrode surface, e.g., a region serving as one pixel.

The hole diameter and its distribution of penetration holes present in a member having a plurality of penetration holes disposed so as to correspond to a specific region, which are needed for determination of the hole diameter distribution index value D, are determined in the following manner.

The surface of a member having a plurality of penetration holes disposed so as to correspond to a specific region is photographed under a scanning electron microscope (trade name: FE-SEM, S-4500, manufactured by Hitachi, Ltd.) at a magnification of 100 thousand to obtain an image. Next, the hole diameters of respective penetration holes observed within the image are determined. On the basis of the data, the hole diameter distribution and average hole diameter may also be obtained. In addition, in the case where the hole diameter distribution and average hole diameter are evaluated, the number of targets for sampling is set at 100 (However, if the number of penetration holes observed in the image is less than 100, the sampling targets are set to be all the penetration holes). Moreover, for the average hole diameter, a diameter of the circle which is calculated from the area is used.

The details of a member having a plurality of penetration holes used in the invention will be set forth later, but as a member having a plurality of penetration holes, a member in which the hole diameter distribution is substantially monodisperse is usually used. Because of this, usually, the utilization of a display method of the exemplary embodiment enables the display of clear color. However, as a matter of course, the utilization of a member having a plurality of penetration holes in which the hole diameter distribution index value D is intentionally controlled so as to be large may also be used for controlling color to be displayed to a direction in which the color is unclear.

From the viewpoint of making the coloring density to be higher, the density of penetration holes present per area may be made to be high. Additionally, taking into account the fact that the largest density of penetration holes present per area varies depending on the average hole diameter, the area ratio of penetration holes per area on the surface of a member having a plurality of penetration holes may be 10% or higher, specifically 20% or higher, more specifically 40% or higher. If the area ratio is less than 10%, the coloring density is insufficient in some cases.

On the contrary, the upper limit of the area ratio is not particularly limited, however, in the case where the area ratio is too large, adjacent penetration holes become continuous with each other to readily form one hole, whereby the fabrication of a member having a plurality of penetration holes becomes difficult in some cases, so the area ratio may practically be 60% or less.

On the other hand, in the invention, at the time of display of an image, deposition of a metal in penetration holes is at least carried out, so the control of the amount of deposition of a metal deposited in the penetration holes enables formation of metal particles having a variety of aspect ratio in the penetration holes. Therefore, when display is carried out, the control of the aspect ratio of metal particles deposited in the penetration holes enables obtaining various effects other than the improvement in coloring density.

As preliminary knowledge for specific description of the above mentioned effects, first, optical properties which a columnar metal has but a spherical metal does not have will be set forth in reference with FIGS. 1 to 5 shown in the following.

However, FIGS. 1 to 5 shown in the following emphatically describe the characteristics qualitatively and conceptually, for easy understanding of typical characteristics of the optical properties of a columnar metal (In addition, see, as required for example, Chapter 4 and so forth of "Designing and Application Techniques of Plasmon Nanomaterials (CMC Publishing Co., Ltd.)" for more precise/detail optical properties of columnar metals.).

FIG. 1 shows a graph indicating one example of a typical absorption spectrum of a columnar metal oriented randomly. Here, in the drawing, the abscissa indicates the wavelength; the ordinate indicates the absorbance. The absorption spectrum indicated as a combined spectrum of peak P (S1) in the shorter wavelength region and peak P (L1) in the longer wavelength region indicated by a solid line in the drawing (a wave pattern indicated by solid lines indicating peaks P (S1) and P (L1) and an alternate long and short dash line indicating an overlap of both peaks in the drawing) means an absorption spectrum attributable to the columnar metal (the rectangle represented by the symbol ML) schematically shown in the upper part of the drawing.

In the columnar metal shown in the upper part of the drawing, the short axis length is S1 and long axis length is L1 (provided that L1/S1 is a value sufficiently larger than 1), and the combined spectrum in the drawing indicates a result in the case where a plurality of columnar metal particles randomly oriented are observed.

An absorption spectrum of a columnar metal as shown in FIG. 1 is formed by combining peak P (S1) component in the shorter wavelength region which is an absorption spectrum attributable to the short axis component of the columnar metal and peak P (L1) component in the longer wavelength region which is an absorption spectrum attributable to the long axis component of the columnar metal with weighting so that each of the axis components is visually recognized.

Figure 2:
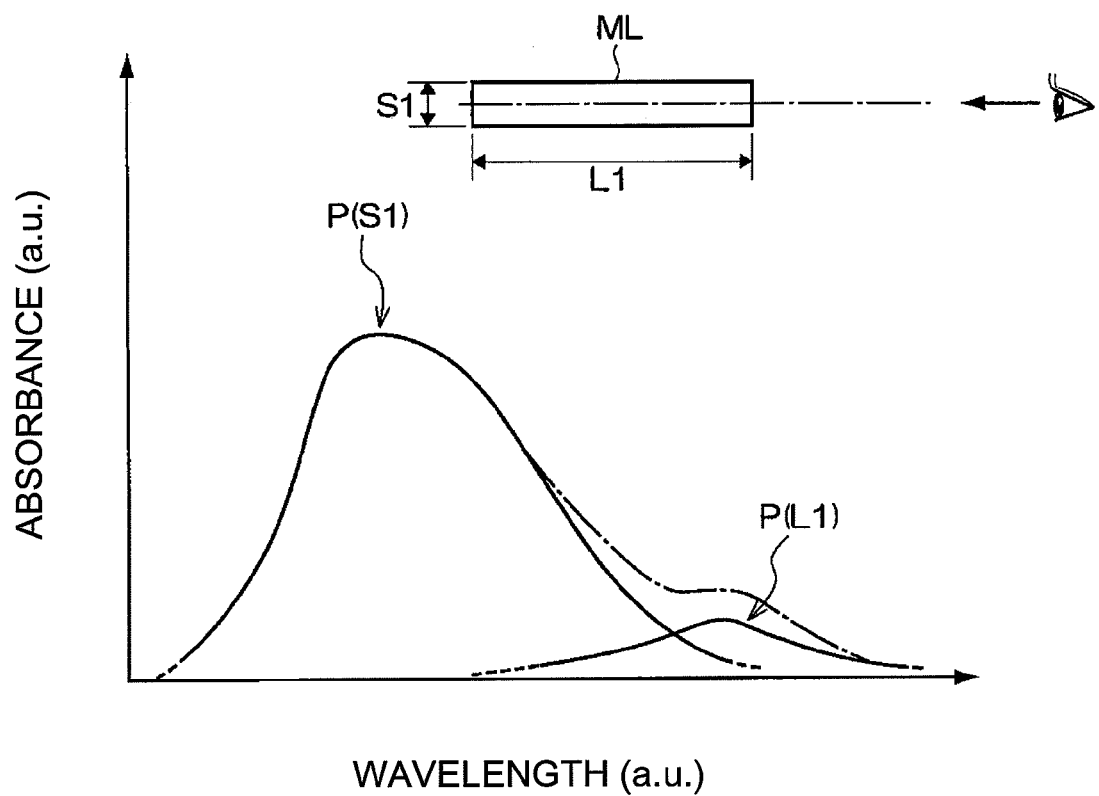
FIG. 2 shows a graph indicating one example of an absorption spectrum of a columnar metal oriented in one direction.

As such, in the case where columnar metal particles are oriented in one direction, when the columnar metal particles are observed from the long axis direction thereof, the intensity of peak P (L1) component is observed to be relatively very weak relative to that of peak P (S1) component, as compared with spectrum indicated in FIG. 1 (see FIG. 2. In the drawing, the EYE mark indicated on the right-hand side in the long axis direction of the columnar metal indicates the position of an observer and the same applies to the cases in FIG. 3 and subsequent drawings.).

Figure 3:
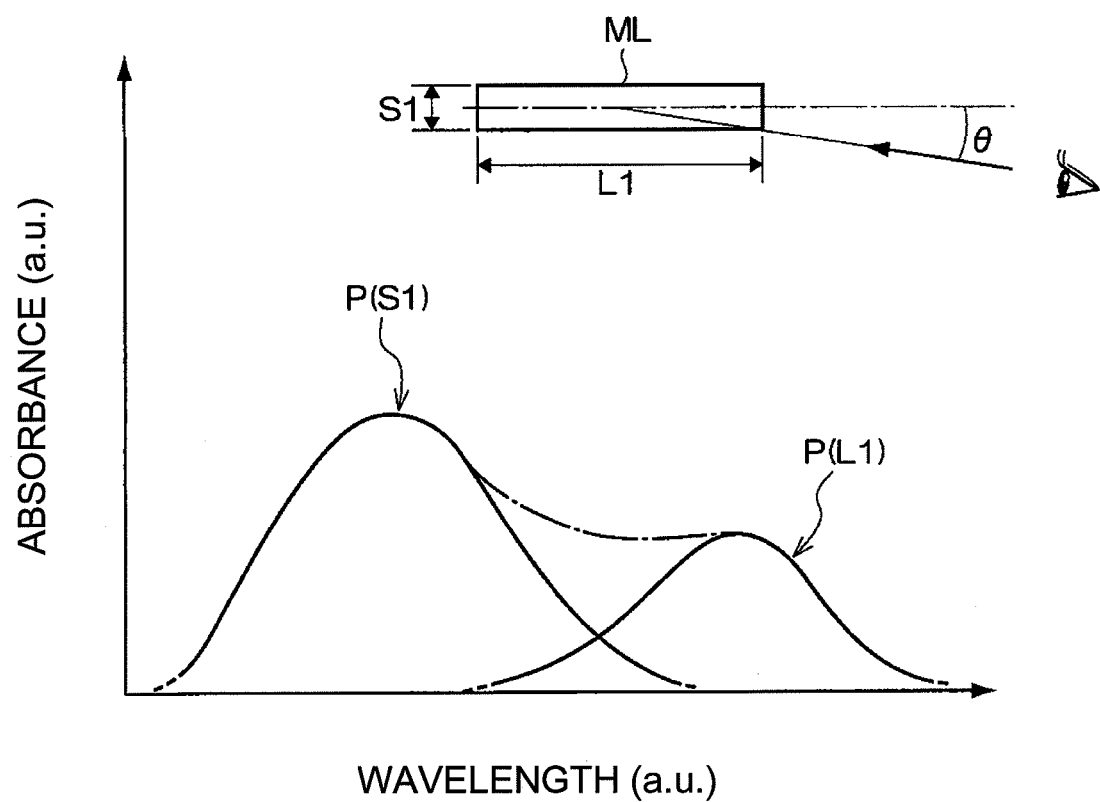
FIG. 3 shows a graph indicating another example of an absorption spectrum of a columnar metal oriented in one direction.

In the case where columnar metal particles are oriented in one direction, when the columnar metal particles are observed from the direction that takes an angle of θ0 (wherein θ indicates an acute angle of from greater than 0 degrees to 90 degrees) with the length direction of the columnar metal, the intensity of peak P (L1) is observed to be relatively strong relative to that of peak P (S1), as compared with spectrum indicated in FIG. 2 (FIG. 3). In this manner, in the case where columnar metal particles are oriented in one direction, the wave pattern of an absorption spectrum alters depending on the observation direction and a color visually recognized is changed.

Moreover, in the case where columnar metal particles are oriented in one direction, the observation of columnar metal particles through a polarizing plate may provide a wave pattern of an absorption spectrum in which any one of the peak P (S1) and peak P (L1) components is selectively cut.

Figure 4:
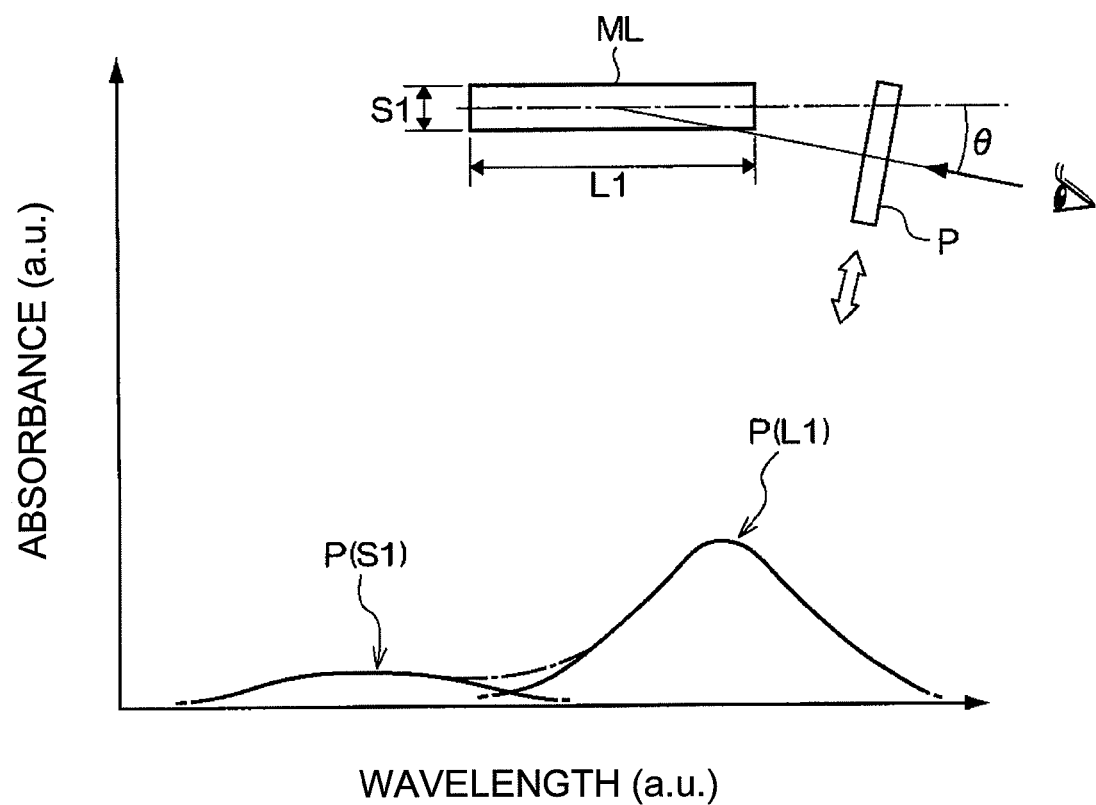
FIG. 4 is a graph indicating one example of an absorption spectrum in the case where a columnar metal is observed via a polarizing plate in the example indicated in FIG. 3.

FIG. 4 is a graph indicating one example of an absorption spectrum in the case where columnar metal particles are observed via a polarizing plate in the example indicated in FIG. 3. In the example in FIG. 4, a polarizing plate represented by the symbol P between the columnar metal and observer is disposed in such a way that the polarizing plate surface perpendicularly intersects with the observation direction indicated by an arrow in the drawing. The angle θ between the long axis of the columnar metal and the observation direction indicates an acute angle of from greater than 0 degrees to several degrees. Here, when considering that the observation direction is a reference axis and the columnar metal is oriented so as to take an angle of θ with the reference axis, the polarizing plate is disposed such that the polarized component (indicated by an outlined arrow in the drawing), which is in a parallel direction to the vector of a component perpendicular to the reference axis, of the orientation vectors of the columnar metal (in the drawing, the vector parallel to the alternate long and short dash line indicated as the central axis of the columnar metal) is cut. Because of this, an absorption spectrum in which a polarized light interacting with the short axis direction is cut from the absorption spectra indicated in FIG. 3 is observed (FIG. 4).

Therefore, in the case where columnar metal particles are oriented in one direction, when the columnar metal is observed from the long axis direction or observed from an angle deviated by several degrees relative to the long axis direction, usually, only an absorption spectrum primarily attributable to peak P (S1) component as illustrated in FIG. 2 may be observed. However, if a polarizing plate is utilized as illustrated in FIG. 4, when the columnar metal is observed from an angle deviated by several degrees relative to the long axis direction, an absorption spectrum attributable to peak P (L1) component rather than an absorption spectrum attributable to peak P (S1) component may be primarily observed.

In other words, even if the columnar metal is observed from substantially the same position, the utilization of a polarizing plate changes the wave pattern of an absorption spectrum to be observed, thereby changing the color visually recognized.

On the other hand, the wave pattern of an absorption spectrum of a columnar metal may be controlled by the selection of the kind, size, or shape of a metal constituting the columnar metal, which is the same as in the case of spherical metal particles. However, the factor of controlling the size or shape of spherical metal particles is only a particle diameter, while, in the case of a columnar metal, the two control factors of the short and long axes may be controlled independently (In other words, the aspect ratio may be varied freely). Because of this, when a spherical metal and a columnar metal, having the same metal composition, are compared to each other, a columnar metal rather than a spherical metal may be said to enable obtaining a variety of wave patterns of absorption spectra.

Figure 5:
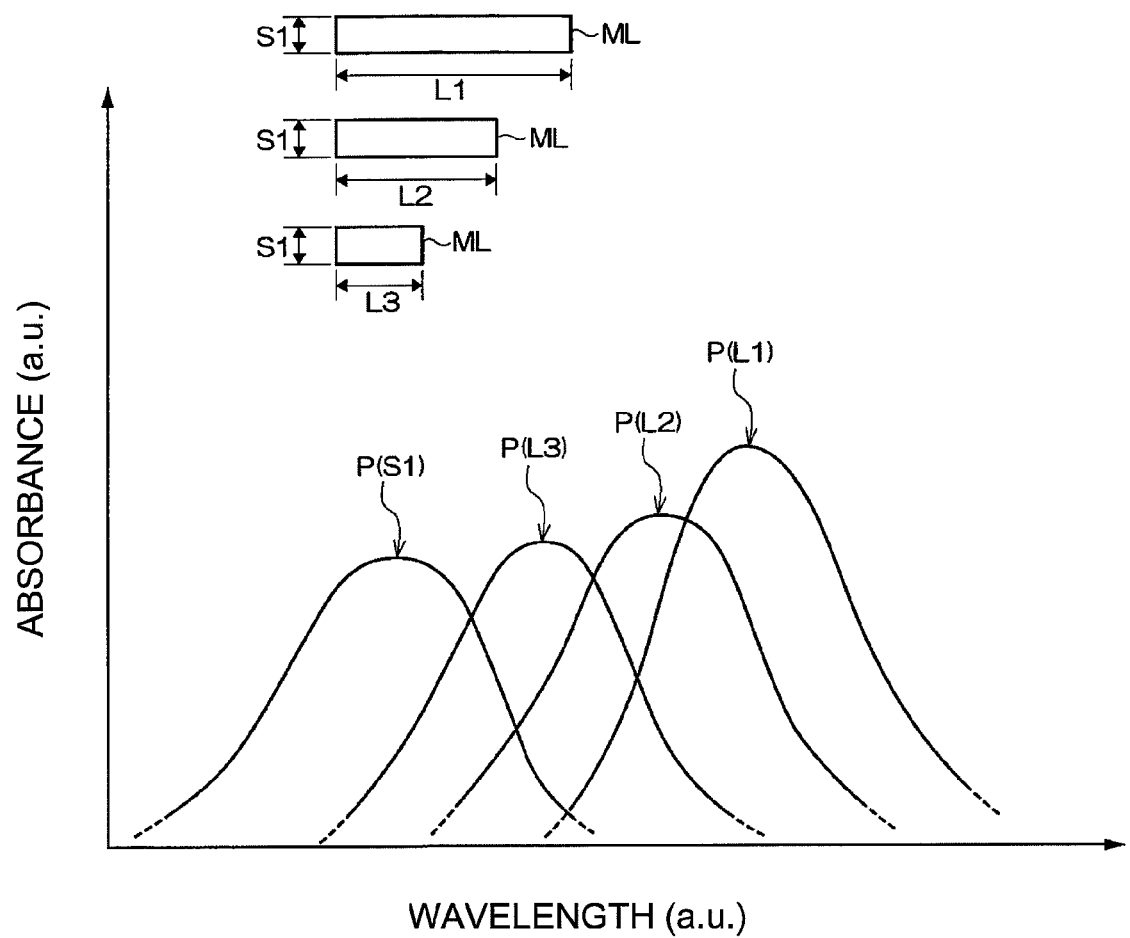
FIG. 5 shows a graph indicating one example of changes in the peak component in a longer wavelength region of an absorption spectrum attributable to the long axis component of a columnar metal in the case where the length of the long axis is changed to three levels of L1, L2 and L3 in a state in which the length of the short axis of the columnar metal is fixed at S1 in the example indicated in FIG. 1.

FIG. 5 shows a graph indicating one example of changes in the peak component in a longer wavelength region of an absorption spectrum attributable to the long axis component of a columnar metal in the case where the length of the long axis is changed to three levels of L1, L2 and L3 in a state in which the length of the short axis of the columnar metal is fixed at S1 in the example indicated in FIG. 1.

In the drawing, P (L1) indicates an absorption spectrum attributable to the long axis component of a columnar metal in the case where the length of the long axis of the columnar metal is L1, P (L2) indicates an absorption spectrum attributable to the long axis component of a columnar metal in the case where the length of the long axis of the columnar metal is L2, P (L3) indicates an absorption spectrum attributable to the long axis component of a columnar metal in the case where the length of the long axis of the columnar metal is L3, and S1, L1, L2 and L3 satisfy the relation of S1<L3<L2<L1. In addition, in consideration of description, the description will be omitted on a combined spectrum of an absorption spectrum attributable to the long axis component and an absorption spectrum attributable to the short axis component.

As indicated in FIG. 5, it is shown that as the length of the long axis of a columnar metal becomes short from L1 to L2 to L3 (as the aspect ratio becomes smaller), the intensity and the largest absorption wavelength of the wave pattern of an absorption spectrum attributable to the long axis component of a columnar metal change. As a result, even if the lengths of the short axes of columnar metals are the same, the change of the length of the long axis alters the absorption spectrum of a columnar metal, thus changing the color to be visually recognized.

Exemplary embodiments making use of optical properties of columnar metals as described above include, for example, an embodiment in which the angle (hereinafter, sometimes abbreviated by a "hole axis angle") between a face (hereinafter, sometimes referred to as a "reference face") of the substrate opposite to the face thereof on which a transparent electrode is disposed and the hole axis of the penetration hole is within the range of from 0 degrees to less than 90 degrees, i.e., the hole axis angle with respect to the reference face is not orthogonal. Making the hole axis angle be in the range as mentioned above has merits in the following.

First, when a display medium making use of a display method of the exemplary embodiment is produced, from the viewpoint of the simplicity of the construction of a display medium and productivity, the substrate, on the surface of which a metal is deposited from an electrolytic solution, may, for example, have the construction described below.

That is, construction examples of the substrate include a substrate constructed by forming an ITO (Indium Tin Oxide) film as a transparent electrode on one face of a glass substrate having both faces being flat, forming an aluminum film as a member having a plurality of penetration holes on the transparent electrode surface by vapor evaporation or the like, and then making penetration holes penetrating the member in the direction of the film thickness of the aluminum film by anodic oxidation. A substrate having a member having a plurality of penetration holes and a transparent electrode produced via this process includes a member having a plurality of penetration holes such that the hole axis angle becomes 90 degrees.

On the other hand, although depending on the construction of the display medium, applications, or the like, it is thought that in general a displayed image is observed from the direction substantially perpendicular to the reference face more often than the case of being observed from the other directions.

Accordingly, supposing that a displayed image is observed from the direction substantially perpendicular to the reference face, if the hole axis angle is 90 degrees, only the color corresponding to an absorption spectrum consisting primarily of the peak component attributable to the short axis direction of the columnar metal as indicated in FIG. 2 may basically be observed in a state in which the columnar metal is deposited in the penetration hole.

On the other hand, if the hole axis angle is within the range of from 0 degrees to less than 90 degrees, a color that corresponds to an absorption spectrum attributable to the short axis direction of the columnar metal and an absorption spectrum wherein the intensity of the peak component attributable to the long axis direction of the columnar metal is increased relative to the intensity of the peak component attributable to the short axis direction of the columnar metal in accordance with the decrease in the hole axis angle (in FIG. 3, the angle expressed by (90-θ) degrees) as shown in FIG. 3 may be observed. Furthermore, if the hole axis angle is made to be 0 degrees, a color that corresponds to the absorption spectrum (an absorption spectrum consisting primarily of the peak component attributable to the long axis direction of the columnar metal) of the inverse pattern of the absorption spectrum indicated in FIG. 2 may be observed.

That is, the change of the hole axis angle enables display in different colors, even if the length of the short axis and the aspect ratio of a columnar metal deposited in the penetration hole are constant. Because of this, by the selection of the hole axis angle in the range of from 0 degrees to less than 90 degrees, display in more various colors may be carried out.

Although the hole axis angle may be arbitrarily set according to the color to be displayed, for example, (1) in the case where a color needs to be obtained that corresponds to an absorption spectrum wherein the peak component attributable to the short axis direction of the columnar metal is more emphasized than the peak component attributable to the long axis direction of the columnar metal, the hole axis angle may be from greater than 80 degrees to less than 90 degrees, (2) in the case where a color needs to be obtained that corresponds to an absorption spectrum wherein the peak component attributable to the long axis direction of the columnar metal is more emphasized than the peak component attributable to the short axis direction of the columnar metal, the hole axis angle may be from greater than 0 degrees to less than 10 degrees, (3) in the case where a color needs to be obtained that corresponds to an absorption spectrum wherein both of the peak component attributable to the short axis direction of the columnar metal and the peak component attributable to the long axis direction of the columnar metal are emphasized in a well-balanced manner, the hole axis angle may be from 10 degrees to 80 degrees, (4) in the case where a color needs to be obtained that corresponds to an absorption spectrum consisting primarily of the peak component attributable to the long axis direction of the columnar metal, the hole axis angle may be 0 degrees, and (5) in the case where a color needs to be obtained that corresponds to an absorption spectrum consisting primarily of the peak component attributable to the short axis direction of the columnar metal, the hole axis angle may be 90 degrees.

On the other hand, as indicated in FIGS. 1 to 3, a color to be observed varies depending on which direction the columnar metal is oriented relative to the observer, and this characteristic may be utilized to control the view angle dependency.

Specifically, as is clear from the graph indicated in FIG. 1, it may be said that the more random the orientation of all the columnar metal particles observed as an image within the view of the observer are, the less difference the color tone tends to have even if the image displayed is observed from any of the directions, and the smaller the view angle dependency is.

In contrast, as is clear from the graphs indicated in FIGS. 2 and 3, it may be said that the more oriented in one direction all the columnar metal particles observed as an image within the view of the observer are, the more difference the color tone tends to have depending on the observation direction, and the larger the view angle dependency is.

Thus, when a display having a small degree of view angle dependency needs to be carried out, any one part of all the penetration holes in a member having a plurality of penetration holes are oriented in one direction, any other part of them are oriented in another direction, and the angle (hole axis crossing angle) between the hole axis of the penetration holes oriented in the one direction and the hole axis of the penetration holes oriented in the another direction may be within the range of from 5 degrees to 90 degrees, specifically within the range of from 15 degrees to 90 degrees. When the hole axis crossing angle is less than 5 degrees, the degree of view angle dependency becomes large in some cases.

The hole axis crossing angle within the above mentioned range, when in all the penetration holes three or more orientation directions are present, may be satisfied in at least any one combination of the orientation directions. However, from the viewpoint of the view angle dependency being made to be smaller, the hole axis crossing angle may be satisfied in more combinations of the orientation directions.

The ratio (N2/N1) of the number of the penetration holes oriented in the another direction (N2) to the number of the penetration holes oriented in the one direction (N1), whose hole axis crossing angle satisfies the above mentioned range, may be within the range of from 1 to 3, specifically within the range of from 1 to 1.5, more specifically 1. In the case where N2/N1 deviates from the above mentioned range, (N1+N2) penetration holes may be substantially oriented in the same direction, so that it sometimes becomes difficult to make the view angle dependency small.

On the other hand, in the case where a display having a particularly large degree of view angle dependency is desired, all the penetration holes in a member having a plurality of penetration holes may be oriented in one direction.

Although the effect is slightly inferior to the above case, in the case where a display having a large degree of view angle dependency is desired, any one part of all the penetration holes in a member having a plurality of penetration holes are oriented in one direction, another part thereof are oriented in another direction, and the angle between the hole axis of the penetration holes oriented in the one direction and the hole axis of the penetration holes oriented in the another direction may be within the range of from greater than 0 degrees to less than 5 degrees. If the angle is in this range, unevenness of color viewed from a certain direction is rarely present. In the case where the hole axis crossing angle is 5 degrees or more, the view angle dependency is small in some cases.

Additionally, the hole axis crossing angle within the above described range, when in all the penetration holes three or more orientation directions are present, may be satisfied in all the combinations of the orientation directions. In at least any one of the combinations of the orientation directions, when the hole axis crossing angle does not meet the above described range, the view angle dependency becomes small in some cases.

As another exemplary embodiment utilizing the optical characteristics of a columnar metal, an embodiment may be carried out wherein in the case where an observer is present at at least any side selected from the side of a member having a plurality of penetration holes on which a transparent electrode is disposed and the side thereof opposite to the side on which the transparent electrode is disposed, a polarizing plate is disposed in an arbitrary position which is between the observer and the member having a plurality of penetration holes and which shields the member having a plurality of penetration holes from the observer.

In this case, when the observer observes an image displayed on a substrate, a color is observed that corresponds to an absorption spectrum wherein a peak component attributable to the short axis direction or long axis direction of a columnar metal deposited in the penetration hole is selectively cut from an absorption spectrum observed in the case where a polarizing plate is not placed, according to the combination of a hole axis angle and a polarized direction capable of being cut by a polarizing plate. In other words, the utilization of a polarizing plate enables the display of a different color that has not been exhibited without the utilization of a polarizing plate. That is, if a polarizing plate is used, a display color when a columnar metal is deposited may be selected.

On the other hand, in order that an image once displayed is deleted or rewrited or the color tone or design of an image is changed, a metal deposited in a penetration hole at least through a metal deposition may be redissolved in an electrolytic solution.

From this viewpoint, the display method of the exemplary embodiment may include dissolving a metal by applying an electric field for oxidizing a metal deposited in the penetration hole via at least a transparent electrode to the electrolytic solution, in a state in which a metal is deposited in a penetration hole at least through a metal deposition.

Accordingly, after an image is displayed at least through depositing a metal, another image (including the case where a solid color is displayed) may be displayed through dissolving a metal, so that a variety of images may be easily displayed by changing therebetween.

Here, the metal deposition and metal dissolution may be carried out in an arbitrarily order, and the deposition and dissolution amounts of a metal when each step is carried out may also be selected arbitrarily.

For example, in the case where the aspect ratio of a penetration hole is 10, each of the steps may be carried out, for example, in the order such that metal deposition is carried out to deposit a columnar metal having an aspect ratio of about 2 in the penetration hole and to display a first image, and then second metal deposition is carried out to deposit a columnar metal having an aspect ratio of about 8 in the penetration hole and to display a second image, and further metal dissolution is carried out to dissolve a portion of the columnar metal within the penetration hole such that the aspect ratio becomes about 4 to display a third image, and then second metal dissolution is carried out to dissolve all the metal within the penetration hole to display a fourth image.

In the case where metal deposition is carried out, within the range of the aspect ratio of a penetration hole, by controlling the conditions of the electric field applied to an electrolytic solution, a metal particle having an arbitrary aspect ratio may be deposited in the penetration hole.

However, in the case where the aspect ratio of a metal particle deposited within the penetration hole after the implementation of metal deposition is less than 2, it becomes difficult to carry out display making use of optical properties of columnar metals illustrated in FIGS. 1 to 5. In this case, the expressive power of the color and the change of an image to be displayed becomes substantially the same as that in the case where a metal particle having an aspect ratio of about 1 is deposited.

From this viewpoint and the viewpoint of improvement in coloring density as described above, when metal deposition is carried out, the aspect ratio of a columnar metal deposited within a penetration hole (within the range of the aspect ratio of a penetration hole) may be two or more, specifically 5 or more, more specifically 10 or more. The upper limit of the aspect ratio of a columnar metal to be deposited within a penetration hole is not particularly limited so long as it is within the range of the aspect ratio of the penetration hole or less and may be practically 30 or less from the viewpoints of the restraint of a decrease in the image display speed and the like.

When, in a state in which a first image is displayed, the display is changed from a first image to a second image (different from the first image) by carried out at least one step selected from metal deposition and metal dissolution, when the change from the first image to the second image is completed, the above mentioned at least one of metal deposition and metal dissolution may be carried out in such a way that at least one state is obtained which is selected from a state in which a metal is not deposited in a penetration hole (non-deposition state) and a state in which a metal is deposited in a penetration hole and the ratio (aspect ratio) of the length of the hole axis direction of the penetration hole to the largest diameter of the metal deposited in the penetration hole is two or more (deposition state).

Here, the aspect ratio in a deposition state may be 5 or more, specifically 10 or more. In the case where metal deposition and metal dissolution are not carried out so as to always obtain the above mentioned non-deposition state and deposition state, a higher coloring density may not be always obtained when displaying is carried out by changing an image. In addition, the upper limit of the aspect ratio in a deposition state is not particularly limited so long as the ratio is within the range of the aspect ratio of the penetration hole.

(Display Medium and Display Device)

—Display Medium—

Next, the display medium making use of a display method of the exemplary embodiment will be set forth. The display medium of the exemplary embodiment is not particularly limited in its construction so long as the display medium has a practicable construction, but practically may have the construction as indicated below.

That is, the display medium of the exemplary embodiment includes: a first substrate having transparency and provided with a transparent electrode on one face thereof; a member having a plurality of penetration holes, the member being placed on a surface of the transparent electrode, the penetration holes penetrating the member from the transparent electrode surface side, the ratio of the length of each of the penetration holes to the largest hole diameter being two or more; a second substrate placed so as to face the transparent electrode side of the first substrate; an electrolytic solution containing a metal ion and placed so as to fill a space between the first and second substrates; and a counter electrode placed in a position so as to be insulated from the transparent electrode and in contact with the electrolytic solution.

If a counter electrode is disposed so as to be insulated from the transparent electrode and in a position in contact with the electrolytic solution, it is may be disposed in an arbitrarily position in the display medium. However, the counter electrode may usually be disposed on the face of the second substrate at the first substrate side thereof. Hereinafter, in consideration of description, unless otherwise described, description will be given, supposing that the counter electrode is disposed on the face of the second substrate at the first substrate side thereof.

On the other hand, the display medium may be constructed in such a manner that the hole axis angle is 90 degrees from the viewpoint of easy production of the display medium, and the like. Alternatively, as described above, the hole axis angle may be in the range of from 0 degrees to less than 90 degrees (the reference face in the above display medium is a face of the first substrate opposite to the face thereof on which the transparent electrode is placed). In this case, with respect to the hole axis angle, it is not necessarily required that all the penetration holes in a display medium have the same angle, and for example, they may have a different angle in respective pixel units, or may have a different angle within a pixel.

With respect to the orientation direction of a penetration hole, it is not necessarily required that all the penetration holes in a display medium are oriented in the same direction, and they may be oriented in a different direction in respective pixel units, or may be oriented in a different direction within a pixel. Similarly, it is not necessarily required that the characteristic values specifying a shape such as the short axis length or aspect ratio of a penetration hole are the same in all the penetration holes in a display medium, and for example, may be different in respective pixel units or may be different within a pixel.

In addition thereto, for the purpose of control of the view angle dependency as described above, the orientation direction of a penetration hole or a hole axis crossing angle may be selected.

When using a polarizing plate, practically, a polarizing plate may be disposed in at least any of the positions selected from between the first substrate and transparent electrode and on a face of the first substrate opposite to the face thereof on which the transparent electrode is placed.

In the display medium of the exemplary embodiment, usually, the reference face serves as a display face (face at the side where an image is displayed), but in the case where the second substrate and counter electrode are made of a material capable of transmission of light with a wavelength of the visible region, the face of the second substrate opposite to the face thereof on which the counter electrode is disposed may also be utilized as a display face. In this case, if required, a polarizing plate may be disposed in any of positions selected from between the second substrate and counter electrode, and on the face of the second substrate opposite to the face thereof on which the counter electrode is disposed.

Here, in the case where the hole axis angle is 90 degrees (or 0 degrees), a polarizing plate is disposed in such a way that the polarized component in a direction parallel to the reference face may be cut. In which direction in the reference face the polarized component is cut may be selected as required.

In the case where the hole axis angle is from greater than 0 degrees to less than 90 degrees, a polarizing plate is disposed in such a manner that the polarized component in the direction parallel to the vector of the component parallel to the reference face of the orientation vectors of the penetration holes (vectors parallel to the hole axis of the penetration holes) is cut.

The electrode may be separated and placed or a partition wall between the pair of substrates may be placed such that the display of only a partial area in the plain face direction of the display medium may be controlled independently from the other areas. A region in which the display is independently controlled (hereinafter, referred to as a "unit region" in some cases) may be directly functioned as one pixel, or a combination of two or more unit regions may function as one pixel as in the case where a combination of a unit region for displaying only red, a unit region for displaying only green and a unit region for displaying only blue functions as one pixel.

In the case where a display medium has a plurality of unit regions or pixels and a polarizing plate is used, the direction of a polarized component to be cut may be selected per unit region or pixel and a polarizing plate may be disposed.

In a display medium of the exemplary embodiment as described above, an image is displayed in at least one state selected from a first state in which a metal is not deposited in the penetration holes and a second state in which a metal is deposited in the penetration holes. In other words, an image to be displayed may be an image corresponding to the case where all the penetration holes select any one of the states of the first state and the second state, or may be an image corresponding to the case where a part of all the penetration holes select the first state and another part thereof select the second state.

Here, when displaying is carried out while an image to be displayed is changed, at every time when the changing from one image to another image is completed, in the case where the second state is selected in at least a part of all the penetration holes, the ratio (aspect ratio) of the length in the hole axis direction of the penetration hole to the largest diameter of the metal deposited in the penetration hole may be two or more, specifically five or more. In this case, even if display is carried out while an image to be displayed is changed, a high coloring density may always be maintained in all the images to be displayed. The upper limit of the aspect ratio in this case is not particularly limited so long as the upper limit is within the range of the aspect ratio of the penetration hole or less, but practically may be 30 or less.

Next, each member constituting a display medium will be set forth in detail.

—Electrolytic Solutions—

An electrolytic solution is not particularly limited so long as it contains a solvent and a metal to be deposited in a penetration hole in its solvent as its metal ion, and may contain, as required, a variety of materials in addition thereto.

First, as a metal ion (or metal), known ones may be used so long as the metal is ionized and dissolved by electrochemical oxidation reaction and the metal ion is deposited as its metal by electrochemical reduction reaction, and examples thereof include a gold ion, silver ion, copper ion, platinum ion, palladium ion, rhodium ion, ruthenium ion, nickel ion, iron ion, cobalt ion, zinc ion, lead ion, chromium ion, tin ion, and the like.

On the other hand, the counter ion of the metal ion is not particularly limited so long as the metal ion may be stably present in an ion state in an electrolytic solution when not applying an electric field to the electrolytic solution, and examples thereof include a fluorine ion, chlorine ion, bromine ion, bromine ion, iodine ion, perchlorate ion, fluoroborate ion, and the like. In addition, the metal ion concentration in an electrolytic solution may be within the range of from 0.001 mol/l to 5 mol/l, from the viewpoints of the stability of an electrolytic solution, the assurance of a coloring density, the response rate from the application of an electric field to the display of an image, and the like.

The metal ion may be a gold ion or silver ion of the above listed ions. In this case, examples of the gold ion compound that are added to a solvent upon the preparation of an electrolytic solution include chloroauric acid, sodium chloroaurate, gold sodium thiosulfate, sodium chloroaurate, sodium gold sulfite, and the like. Examples of the silver ion compound include silver halide, silver nitrate, and the like.

On the other hand, examples of the solvent that may be utilized include one kind or combinations of two or more kinds of water, alcohols such as methanol, ethanol and isopropyl alcohol, other non-aqueous solvents (organic solvents, and the like), and the like. Additionally, examples of other additives that may be added, as required, to an electrolytic solution include water soluble resins, surfactants, electrolytes (e.g., alkaline metal ions, and so forth) other than metal ions (to be deposited as metals), polymer particles, metal oxide particles, and the like.

Examples of the non-aqueous solvents may include ethylene carbonate, propylene carbonate, butylene carbonate, dimethyl carbonate, diethyl carbonate, ethylmethyl carbonate, methyl acetate, ethyl acetate, ethyl propionate, dimethyl sulfoxide, γ-butyrolactone, dimethoxyethane, diethoxyethane, tetrahydrofuran, formamide, dimethyl sulfoxide (DMSO), dimethyl formamide, diethyl formamide, dimethyl acetamide, acetonitrile, propionitrile, methylpyrrolidone, and the like, and aprotic non-aqueous solvents such as silicone oil.

Examples of the water soluble resins that may be used singly or in combination include polymers such as polyalkylene oxides such as polyethylene oxide, polyalkylene imines such as polyethylene imines, polyethylene sulfide, polyacrylate, polymethyl methacrylate, polyvinylidene fluoride, polycarbonate, polyacrylonitrile and polyvinyl alcohol.

The dissolution or dispersion of a water soluble resin in a solvent contributes to the control of the movement speed of a metal ion and an electrolytic ion and stability of a metal deposited. The amount of addition is adjusted taking into account the kind of a surfactant and its amount of addition.

A surfactant contributes to the stability of a metal deposited in a penetration hole.

Examples of the surfactants that may be selected include cation surfactants (alkylamine salts, quaternary ammonium salts, and the like), nonionic surfactants (polyoxyethylene alkyl ether, polyoxyalkylene alkyl ether, polyoxyethylene derivatives, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene hardened castor oil, polyoxyethylene alkyl amines, alkylalkanol amides and so forth), anion surfactants (alkyl sulfate ester salts, polyoxyethylene alkyl ether sulfate ester salts, alkylbenzene sulfonate salts, alkylnaphthalene sulfonate salts, alkylsulfosuccinate salts, alkyldiphenyl ether disulfonate salts, fatty acid salts, polycarboxylic acid polymer surfactants, sodium salts of aromatic sulfonate-formalin condensates, β-naphthalene sulfonate-formalin condensate and so forth), amphoteric surfactants, and the like.

An electrolytic solution may be gel. When using a gel electrolytic solution, it is easy to prevent effusion or leak of the electrolytic solution from the display medium even when a portion of the display medium is broken. For the gelation of an electrolytic solution, a water soluble resin or the like may be utilized.

—Substrates—

Examples of the substrates used in the invention include films and film-like substrates of polymers such as polyester (e.g., polyethylene terephthalate), polyimide, methyl polymethacrylate, polystyrene, polypropylene, polyethylene, polyamide, nylon, polyvinyl chloride, polyvinylidene chloride, polycarbonate, polyether sulfone, silicone resin, polyacetal resin, fluorine resin, cellulose derivatives and polyolefin, inorganic substrates such as glass substrates, metal substrates and ceramic substrates, and the like.

Here, the (first) substrate having transparency may be a substrate having a light transmittance to light in the visible region of at least 50% or more, of the substrates listed above, and the transmittance of the substrate may be near 100%.

The second substrate disposed so as to face the first substrate may be arbitrarily selected from the above listed substrates. However, in the case where a display medium of a transparent type is fabricated, a substrate is used that has transparency and has a light transmittance of at least 50% or more.

Examples of the first substrate that may be used include glass substrates, transparent resin substrates comprised of acrylic resin, polycarbonate resin, polyethylene terephthalate resin or combinations thereof. Additionally, the second substrate may be a substrate of the same material as that of the first substrate, and an opaque or colored substrate may also be used, and a resin substrate may be used that is, for example, comprised of an ABS resin (acrylonitrile/butadiene/styrene resin), glass epoxy resin or the like.

As each of the first and second substrates, a substrate in which the plate thickness is constant at any position in the face direction and both faces are a flat is usually used. However, the first substrate may have an uneven surface at the transparent electrode side for the purpose of controlling the hole axis angle at a desired angle. The shape of the uneven surface is not particularly limited but may be a periodical uneven shape in which the cross section shape of the uneven surface portion is formed by a saw tooth-like line.

The display medium of the exemplary embodiment may have flexibility, and in this case the display medium of the exemplary embodiment is readily used for applications such as electronic paper and portable electronic devices and so forth that require flexibility. In the case where the display medium of the exemplary embodiment is used for such applications, as the first and second substrates, substrates having flexibility (a plastic substrate and so forth) may be used.

Moreover, on the first or second substrate, as required, driving switching elements such as wiring, a thin-film transistor, a diode having a metal/insulating layer/metal structure, a variable capacitor and ferroelectrics may be formed.

—Electrodes—

For the electrode materials constituting a transparent electrode and a counter electrode used in the invention, known electrode materials may be utilized, and examples thereof include, for example, conductive materials such as metals such as gold, silver, copper, aluminum, platinum, chromium, cobalt and palladium, conductive ceramics such as ITO, conductive polymers such as polyphenyl vinylene, polyacetylene, polypyrrole and polyaniline (conductivity: 100 S/cm or more). Here, an electrode material used in a transparent electrode may be a material with which the light transmittance to light in the visible region of the transparent electrode may be controlled to be at least 50% or more, and may typically a transparent conductive material such as ITO. In the case where the electrode film thickness is small, a metal such as copper may be utilized. In addition, the light transmittance to light in the visible region of the transparent electrode may be near 100%.

An electrode material used in a counter electrode is not particularly limited so long as the material is a known electrode material. In the case where the display medium is a transparent type, a material similar to an electrode material used in a transparent electrode is utilized.

A counter electrode is normally disposed on the face of the second substrate at the first substrate side thereof. In this case, the transparent electrode and the counter electrode may be disposed in a band fashion on the substrate surface in order that the electrode of the first substrate side and the electrode of the second substrate side cross at right angles, i.e., the electrodes are arranged in rows and columns.

—Member Having a Plurality of Penetration Holes—

A member having a plurality of penetration holes has penetration holes and is placed so as to cover the transparent electrode surface. The placement and formation of a member having a plurality of penetration holes on the transparent electrode surface are not particularly limited but, for example, a method of forming a thin film on the transparent electrode surface and then forming holes from the thin film surface to the transparent electrode (first method), and a method of placing a member having holes penetrating the member in the film thickness direction on the transparent electrode surface (second method) may be used.

Examples of the first method include a method of forming an aluminum film on a transparent electrode surface by means of a known film forming method such as an evaporation method and then subjecting the aluminum film to anodic oxidation processing to make holes of from the aluminum film surface to the transparent electrode surface, and the like. In the case, the hole diameter, hole diameter distribution, hole density, aspect ratio, and the like of a penetration hole may be controlled by the selection of anodic oxidation processing conditions, the film thickness of an aluminum film or the like.

Examples of the second method include a method of irradiating a film member such as polycarbonate with a beam that decomposes or melts a material constituting a film member such as a neutron beam, and placing the film member having holes penetrating the member in the direction of the thickness of the film member as a member having a plurality of penetration holes on the transparent electrode surface. In the case, the hole diameter, hole diameter distribution, hole density, aspect ratio, and the like of penetration holes may be controlled by the selection of beam radiation conditions, the thickness of the film member or the like. In addition, for the purpose of the control of the hole axis angle, the radiation angel of a beam relative to the film member may also be selected.

A member having a plurality of penetration holes does not need to be placed so as to cover the entire face of a region in which the transparent electrode disposed and, usually, is placed so as to cover the entire face of the transparent electrode surface.

A material constituting a member having a plurality of penetration holes is not particularly limited so long as it is not corroded with an electrolytic solution and, from the viewpoint of improvement of the controllability of the aspect ratio of a metal deposited in a penetration hole, the material may not serve as an electrode by conduction with the transparent electrode.

—Polarizing Plate—

As the polarizing plate, a known polarizing plate may be used so long as a non-polarized light passing through the polarizing plate becomes linearly polarized light. In order to restrain decrease in the brightness of an image to be displayed due to the utilization of a polarizing plate, the transmittance of light having a polarized direction that can pass through a polarizing plate may be desirably high.

—Other Members—

In the display medium of the exemplary embodiment, a partition wall may be disposed between a pair of substrates in order that the outflow of the contents such as a dispersion medium to the outside of the display medium is prevented, or an electrolytic solution filled between the pair of the substrates is separated to form a plurality of cells.

The height of the partition wall is not particularly limited, and may be usually in the range of from 20 μm to 1 mm. In addition, the width of the partition wall is not particularly limited and, from the viewpoint of improvement of the resolution of a display medium, the width may generally be small, and may usually be in the range of from 10 μm to 1 mm.

The material of a partition wall is not particularly limited so long as it exhibits insulation properties and is not dissolved or corroded with an electrolytic solution and, for example, a known photosensitive resin, rubber or the like may be used.

A partition wall may be disposed in such a manner that a layer containing an electrolytic solution filled between a pair of substrates is separated so as to form two or more cells. In this case, respective cells formed by partition walls make it easy to control the deposition of a metal in a penetration hole and the dissolution of the metal once deposited per cell unit. In addition, the disposition of a partition wall may prevent loss of the function of the whole display medium even if a portion of the display medium is broken, because the leak and outflow of an electrolytic solution are occurred only in the broken site.

Additionally, upon the production of a display medium, an adhesive may be used for attachment of a partition wall to a substrate. The adhesive is not particularly limited and a thermosetting resin, ultraviolet curing resin or the like may be used; and a material is selected that does not affect the material of a partition wall, a material constituting an electrolytic solution, or the like.

Furthermore, as required, for the maintenance of a constant space width between a pair of substrates, a rib may be disposed or particles (space width maintaining particles) may be placed that is comprised of a material having a particle diameter similar to the space width between a pair of substrates and not being corroded or deteriorated by an electrolytic solution or application of an electric field.

The particle diameter of a space width maintaining particle may be from 1 μm to 200 μm, specifically from 3 μm to 100 μm. In addition, the particle size distribution of the particles may be narrow and monodisperse. The color of the particle is not particularly limited and may be a faint color or white. A material constituting the particle may be resin, glass, or the like. Moreover, the surface of the particle may be treated with a surface treating agent such as a silane coupling agent or titanate coupling agent, for the improvement of dispersion properties to an electrolytic solution and the prevention of corrosion and dissolution due to the electrolytic solution.

—Electric Field Controller—

The display medium of the exemplary embodiment displays an image in a state in which an electric field applying unit of the outside of the display medium is connected to the electrodes of the display medium.

The electric field applied to an electrolytic solution by the electric field applying unit may be manually controlled according to an image needed to be displayed; however, it may usually be controlled by means of an electric field controller that is constituted by electronic parts or the like such as an IC circuit and controls the electric field applied to the electrolytic solution so that an image corresponding to image information is displayed when image information selected from image information stored in a memory or image information received by a receiver is input.

Utilization of an electric field controller makes it possible to easily display an image needed to be displayed in a display medium. The electric field controller may be disposed outside the display medium or included in the display medium.

On the other hand, when image information is input in an electric field controller, at least one selected from (1) metal deposition by applying an electric field for reducing a metal ion to an electrolytic solution to deposit the metal in a penetration hole, and (2) metal dissolution by applying an electric field for oxidizing a metal deposited in a penetration hole to an electrolytic solution to dissolve the metal deposited in the penetration hole is carried out according to the image information.

Here, when the display of an image corresponding to image information is completed, the above mentioned at least one step may be always carried out in order to obtain at least one of the states selected from a state in which a metal is not deposited in a penetration hole (non-deposition state) and a state in which a metal is deposited in a penetration hole and the ratio (aspect ratio) of the length of the penetration hole in the hole axis direction to the largest diameter of the metal deposited in the penetration hole is two or more (deposition state).

Here, the aspect ratio of a columnar metal in a deposition state may be controlled such that the absorption peak is positioned in a desired range. In this regard, the relationship between the aspect ratio and the absorption peak of a columnar metal varies depending on the kind of metal constituting a columnar metal (e.g., for Au, Ag and Al, the largest absorption peak wavelengths in the case where the aspect ratio is five are respectively about 900 nm, about 750 nm and about 450 nm, and the largest absorption peak wavelengths in the case where the aspect ratio is three are respectively about 700 nm, about 550 nm and about 320 nm). Because of this, the aspect ratio is controlled so as to obtain a desired absorption peak, according to the kind of metal constituting a columnar metal. In addition, the relationship between the aspect ratio and absorption peak may be readily determined by simulation making use of a value of the dielectric of a metal or the like (e.g., see J. Phys. Chem. B, 1999, 103, 8410-8426 (in particular, see equations (5) to (8) and FIG. 5)).

In the case where metal deposition and metal dissolution are not carried out so as to always obtain the above mentioned non-deposition or deposition state, a higher coloring density may not be always obtained when display is carried out by changing an image. Additionally, the upper limit of the aspect ratio in a deposition state is not particularly limited so long as the upper limit is within the aspect ratio of the penetration hole.

—Method of Producing a Display Medium—

The method of producing a display medium is not particularly limited and, for example, a display medium may be produced by the process below. First, a first substrate in which a transparent electrode on one face thereof and a member having a plurality of penetration holes are formed in advance and a second substrate in which a counter electrode is formed on one face thereof are prepared.

Then, partition walls are formed on the face of the first substrate (or the second substrate) at the electrode side thereof so as to correspond to pixels, and then an electrolytic solution is filled in spaces corresponding to pixels separated by partition walls. Next, the first and second substrates are stuck to each other such that the faces having formed thereon the electrodes are faced to each other, and a display medium is produced by sealing the end face portions of the pair of the substrates with a sealant such as rubber or resin. When the sticking is carried out, as required, a space width maintaining particle may be placed between the pair of the substrates.

Moreover, subsequently, as required, a polarizing plate may also be disposed on the face of the first substrate side of the display medium.

—Display Device—

Next, a display device using a display medium described above will be set forth. The display device is provided with an electric field applying unit that is connected to the transparent electrode and the counter electrode disposed within the display medium and applies an electric field to an electrolytic solution.

Therefore, in the case where display is carried out by means of the display device, display may be carried out without connecting to an electric field applying unit of the outside like a display medium. As the electric field applying unit, as required, any of the alternating current power source and direct current power source may be used, and both the sources may be used in combination in the case where the alternate and direct current voltages are superimposed and applied to an electrolytic solution via a pair of electrodes. In addition, the display device may include an electric field controller.

—Specific Example of a Display Medium—

Next, a specific example of a display medium as described above will be set forth in more detail in accordance with drawings.

Figure 6:
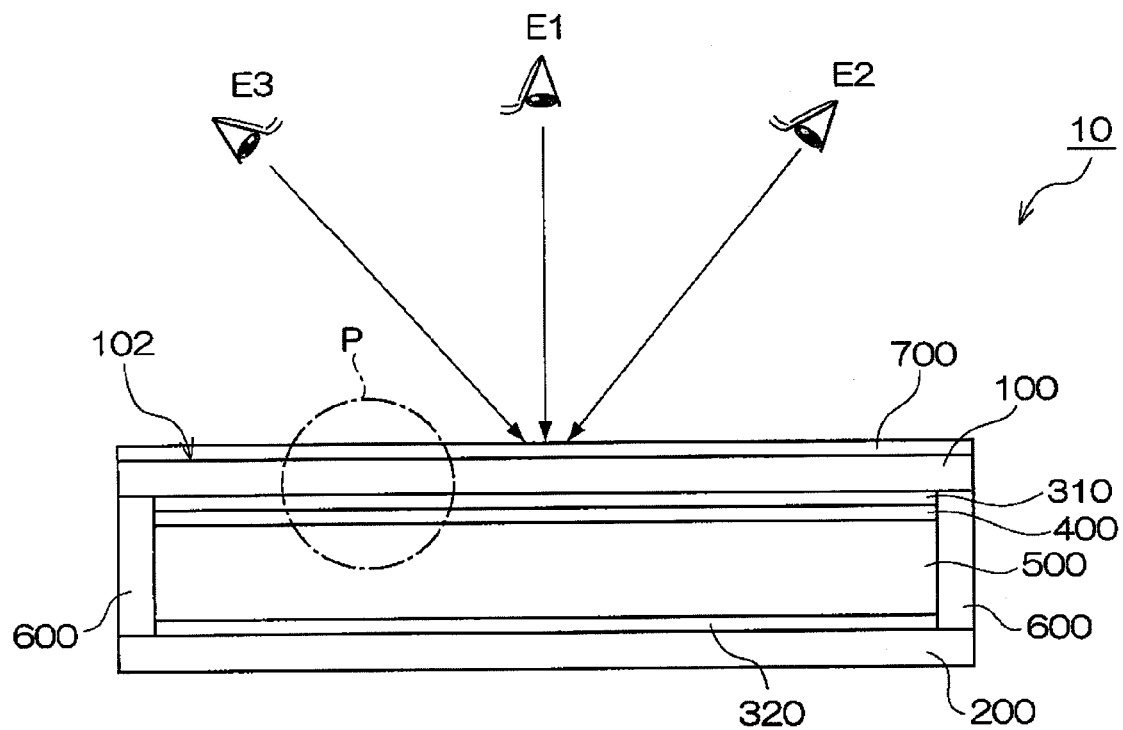
FIG. 6 is a schematic sectional view indicating a cross section of a display medium.
Figure 7:
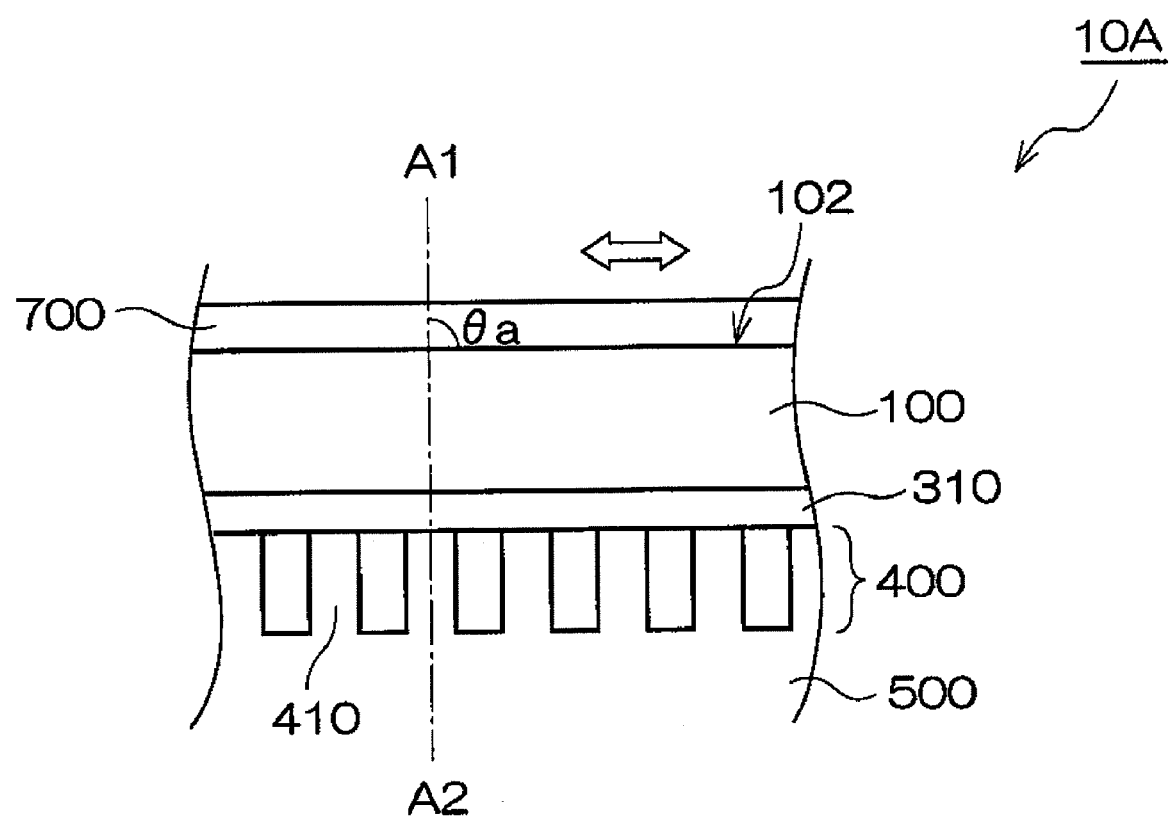
FIG. 7 is an enlarged sectional view indicating one aspect of a display medium indicated in FIG. 6.
Figure 8:
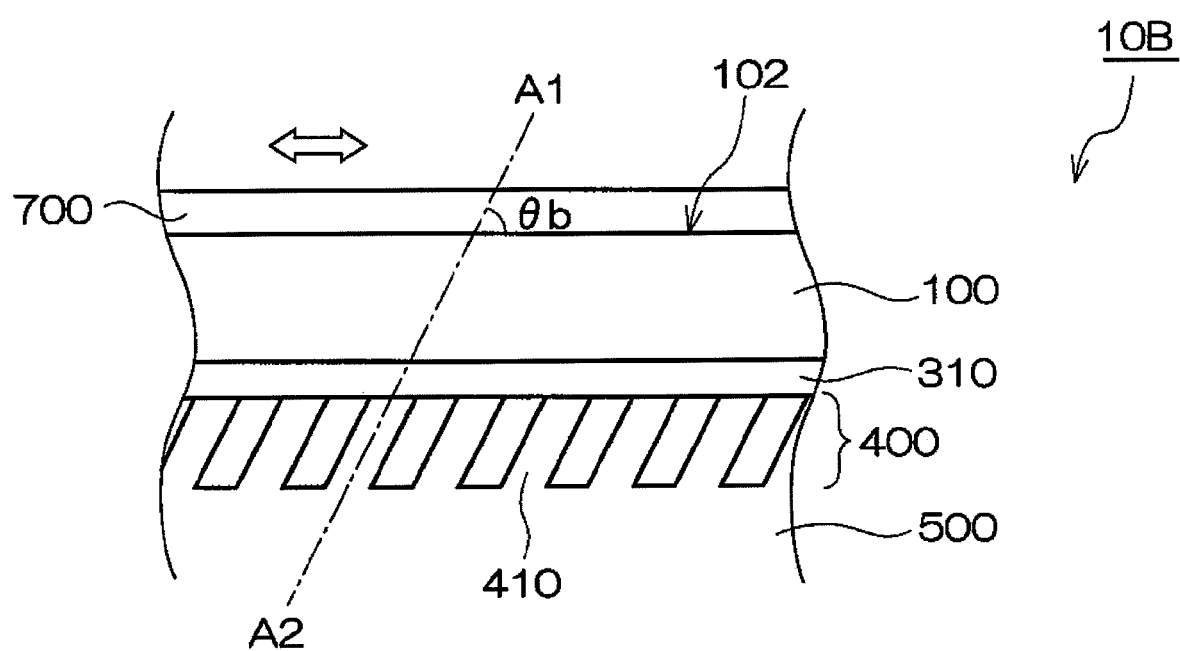
FIG. 8 is an enlarged sectional view indicating another aspect of a display medium indicated in FIG. 6.
Figure 9:
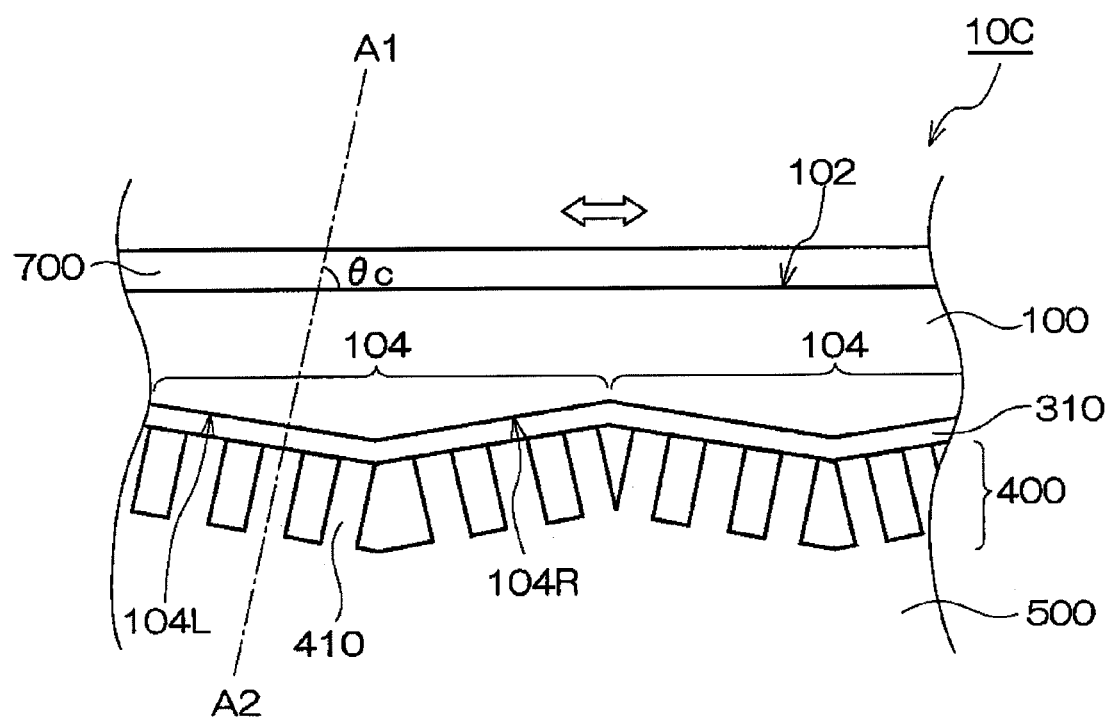
FIG. 9 is an enlarged sectional view indicating another aspect of a display medium indicated in FIG. 6.

FIGS. 6 to 9 are drawings indicating examples of the constructions of display media; FIG. 6 is a schematic cross sectional view indicating a cross section of a display medium; FIGS. 7 to 9 are enlarged drawings enlarging the portion expressed by the symbol P in FIG. 6 and indicate one aspect of a display medium shown in FIG. 6. In FIG. 6, the description of an electric field applying unit is omitted.

In the drawings, reference numerals 10, 10A, 10B, 10C represent a display medium, reference numeral 100 represents a first substrate, reference numeral 102 represents a reference face, reference numeral 104 represent saw tooth-like uneven portion, reference numerals 104R, 104L represent sides constituting tooth-like uneven portion 104, reference numeral 200 represents a second substrate, reference numeral 310 represents a transparent electrode, reference numeral 320 represents a counter electrode, reference numeral 400 represents a member having a plurality of penetration holes, reference numeral 410 represents a penetration hole, reference numeral 500 represents an electrolytic solution, reference numeral 600 represents a partition wall, reference numeral 700 represents a polarizing plate, a alternate long and short dash line drawn between the symbols A1-A2 represents the hole axis of the penetration hole 410, θa, θb, and θc represents the angle between the reference face 102 and the hole axis of the penetration hole 410 (hole axis angle: units are "degrees"), the eye mark expressed by the symbols E1, E2, E3 represents the position of an observer, the both arrows outlined represents the direction of the polarized component cut when non-polarized light passes through the polarizing plate 700.

The display medium 10 shown in FIG. 6 at least includes: the first substrate 100 in which the transparent electrode 310 on one face thereof and the member 400 having a plurality of penetration holes are laminated in this order; the second substrate 200 in which the counter electrode 320 is placed on one face thereof, and the face thereof on which the counter electrode 320 is disposed and the face of the first substrate 100 on which the transparent electrode 310 is disposed are faced to each other; the electrolytic solution 500 filled so as to fill the space between the first substrate 100 and the second substrate 200; the partition walls 600 placed in such a manner that the electrolytic solution 500 is filled in a predetermined area in the space between the first substrate 100 and the second substrate 200; and the polarizing plate 700 disposed on the face (the reference face 102) of the first substrate 100 opposite to the face thereof on which the transparent electrode 310 is disposed.

However, in FIG. 6, the description of the penetration hole 410 disposed in the member 400 having a plurality of penetration holes is omitted, and the electrodes 310, 320 are connected to the electric field applying unit (not shown); an electric field may be applied to the electrolytic solution 500 via the pair of the electrodes 310, 320. In addition, the polarizing plate 700 may not be disposed as required.

The display medium 10 shown in FIG. 6 is shown for one cell portion separated by the partition walls 600, but usually, the cells are two-dimensionally placed so as to form unit regions or pixels. In the description below, in consideration of description, the display medium 10 will be set forth as if it is constituted by only one cell, unless otherwise described.

Next, the display medium 10 indicated in FIG. 6 will be set forth in more detail in reference with FIGS. 7 to 9.

The display medium 10A shown in FIG. 7 indicates one aspect of the display medium 10 shown in FIG. 6; the feature thereof is that the penetration holes 410 are disposed in such a way that the angle θa between the hole axes of all the penetration holes 410 in the display medium 10A and the reference face 102 becomes 90 degrees. The polarizing plate 700 disposed on the display medium 10A is placed such that the polarized component in the direction parallel to the reference face and in the direction parallel to the paper face in the drawing is cut.

Here, in the case where the display medium 10A not having the polarizing plate 700 is observed from the position of the eye mark E1 indicated in FIG. 6 (in the case where the eye point of the observer is present on the paper face of the drawing and the observer observes the medium from the direction substantially orthogonal to the reference face 102, hereinafter, the same), when a columnar metal is deposited in the penetration hole 410, a color corresponding to the absorption spectrum illustrated in FIG. 2 is observed. However, the sight of a human being has broadening to some extent, so taking into consideration this point, strictly speaking, the color corresponding to the absorption spectrum illustrated in FIG. 2 and the color corresponding to the absorption spectrum illustrated in FIG. 3 are observed at the same time. In the description below, description will be made assuming that there is no broadening of the sight, unless otherwise described.

On the other hand, in the case where the display medium 10A having the polarizing plate 700 is observed from the position of the eye mark E1 shown in FIG. 6, when a columnar metal is deposited in the penetration hole 410, no coloring attributable to the columnar metal is principally observed. However, taking into consideration the broadening of the sight of a human being, depending on the area of the display medium, the distance between the display medium and the observer and so forth, a color corresponding to the absorption spectrum illustrated in FIG. 4 is also observed in some cases.

In the case where the display medium 10A is observed from the position of the eye mark E2 shown in FIG. 6 (in the case where the eye point of the observer is present on the paper face of the drawing and the observer observes the medium from the direction taking an acute angle of about 45 degrees with the reference face 102, hereinafter, the same), a color corresponding to the absorption spectrum illustrated in FIG. 4 is observed.

The display medium 10B shown in FIG. 8 indicates another aspect of the display medium 10 shown in FIG. 6; the feature thereof is that the penetration holes 410 are disposed in such a way that the angle θb between the hole axes of all the penetration holes 410 in the display medium 10B and the reference face 102 becomes an acute angle in the range of from greater than 0 degrees to less than 90 degrees. The polarizing plate 700 disposed on the display medium 10A is placed such that the polarized component in the direction parallel to the reference face and in the direction parallel to the paper face of the drawing is cut.

Here, in the case where the display medium 10B not having the polarizing plate 700 is observed from the position of the eye mark E1 indicated in FIG. 6, when a columnar metal is deposited in the penetration hole 410, a color corresponding to the absorption spectrum illustrated in FIG. 3 is observed.

In this state, in the case where observation is carried out from any one of the positions selected from the eye mark E2 shown in FIG. 6 and the eye mark E3 in the position of the line symmetry relative to E2 based on the direction perpendicular to the reference face 102, if the angle θb is about 45 degrees, a color corresponding to the absorption spectrum illustrated in FIG. 2, or a color corresponding to the absorption spectrum (absorption spectrum comprised primarily of a peak component attributable to the long axis direction of the columnar metal) of a inverse pattern to the absorption spectrum illustrated in FIG. 2 is observed.

In other words, in the case where the hole axis takes an acute angle with the reference face and all the penetration holes are oriented only in one direction, the color is readily largely changed depending on the position for observation, so a display of a large degree of view angle dependency is possible.

In contrast, in the case where the display medium 10B having the polarizing plate 700 is observed from the eye mark E1 indicated in FIG. 6, when a columnar metal is deposited in the penetration hole 410, a color corresponding to the absorption spectrum illustrated in FIG. 4 is observed.

The display medium 10C indicated in FIG. 9 shows another aspect of the display medium 10 shown in FIG. 6.

This display medium 10C has the feature of having the construction to be described below. That is, the saw tooth-like uneven portions 104 are periodically formed on the face of the first substrate 100 at the side opposite to the reference face, and the lengths of the two sides 104L (in the drawing, the side constituting the left side of the saw tooth-like uneven portion 104) and 104R (in the drawing, the side constituting the right side of the saw tooth-like uneven portion 104) constituting the saw tooth-like uneven portion 104 are the same. On the surface of the saw tooth-like uneven portion 104 are disposed the transparent electrode 310 and the member 400 having a plurality of penetration holes in this order, and the penetration hole 410 is disposed such that the hole axis with the side 104L makes θc and that the hole axis with the side 104R makes 180−θc.

The polarizing plate 700 disposed on the display medium 10A is placed such that a polarized component in the direction parallel to the reference face and in the direction parallel to the paper face of the drawing is cut. In addition, the distribution density of the penetration holes 410 disposed in the display medium 10A may have no unevenness.

Here, in the case where the display medium 10B not having the polarizing plate 700 is observed from the position of the eye mark E1 shown in FIG. 6, when a columnar metal is deposited in the penetration hole 410, a color corresponding to the absorption spectrum illustrated in FIG. 3.

In this state, even in the case where observation is carried out from any of the eye marks E2 and E3 shown in FIG. 6, (1) although coloring attributable to a columnar metal deposited in the penetration hole positioned on one side of the saw tooth-like uneven portion 104 is changed into a color corresponding to a state in which the wave pattern of the absorption spectrum illustrated in FIG. 3 is shifted to that of the absorption spectrum illustrated in FIG. 2, (2) coloring attributable to a columnar metal deposited in the penetration hole positioned on the other side of the saw tooth-like uneven portion 104 is changed into a color corresponding to a state in which the wave pattern of the absorption spectrum illustrated in FIG. 3 is shifted to that of the absorption spectrum (absorption spectrum comprised primarily of a peak component attributable to the long axis direction of the columnar metal) of the inverse pattern to the absorption spectrum illustrated in FIG. 2. Because of this, as a whole, even in the case where observation is conducted from either position of the eye mark E2 or E3, there is no difference in color actually observed.

That is, in the case where the hole axis takes an acute angle to the reference face and orientation direction of all the penetration holes is not one direction but two or more different directions, changing color significantly is easily controlled by the position of an observer, and display with a small view angle dependency is possible.

On the other hand, in the case where the display medium 10C having disposed thereon the polarizing plate 700 is observed from the position of the eye mark E1 shown in FIG. 6, when a columnar metal is deposited in the penetration hole 410, a color corresponding to the absorption spectrum illustrated in FIG. 4 is observed.

EXAMPLES

The invention will be set forth in more detail by way of example hereinafter; however, the invention is by no means limited to the examples below.

Example 1

—Production of a Display Medium—

A display medium having a construction similar to the display medium illustrated in FIG. 7 except that a polarizing plate is not disposed is produced in the following procedure.

First, aluminum is vapor deposited on an ITO film surface of a first glass substrate (length 30 mm×width 30 mm×thickness 0.5 mm) having disposed thereon the ITO film with a thickness of 20 μm on one face as a transparent electrode to form an aluminum film with a film thickness of 3 μm. Subsequently, this aluminum film is subjected to anodic oxidation treatment.

In the sample for observation prepared under the same conditions, the surface and cross section of the aluminum film after anodic oxidation treatment is confirmed under a scanning electron microscope (trade name: S4500, manufactured by Hitachi, Ltd.) to find formation of a large number of circular penetration holes reaching the ITO film surface from the aluminum film surface, in the aluminum film. The average hole diameter of the penetration holes formed in the aluminum film is 30 nm, the aspect ratio is 10, and the hole density is $4 \times 10^{10}$ holes/mm$^2$. In addition, the hole diameters of the penetration holes are each substantially the same, so the hole diameter distribution of the penetration holes is found to be substantially monodisperse. Moreover, the hole axis of the penetration hole is substantially parallel to the face (reference face) of the first glass substrate opposite to the face thereof on which the ITO film is disposed, whereby the hole axis angle is found to be 90 degrees.

Next, on the aluminum film surface having penetration holes is placed a Teflon (Registered Trademark) with a thickness of 1 mm as a spacer, and further thereon a second glass substrate (length 30 mm×width 30 mm×thickness 3 mm) having formed thereon an Au film with a film thickness of 1 μm as a counter electrode is placed such that the electrode face is faced to the aluminum film face to obtain a laminate consisting of a pair of substrates. At this time, an electrolytic solution is filled between the substrates. The electrolytic solution is prepared by dissolution of 10 mM of $KAuBr_4$ and 0.1 M of NaBr in a DMSO solvent.

Subsequently, the entire face of the laminate edge face is sealed with an ultraviolet curing resin, and then the resulting material is irradiated with an ultraviolet ray and cured to obtain a display medium. When the display medium is fabricated, a leading wire of an appropriate length is connected such that an electric current passes through the electrodes.

—Evaluation—

To the display medium obtained is applied a direct current voltage of 1.5 V for 10 seconds by use of an Au electrode as an anode and an ITO electrode as a cathode. At this time, when the display medium is observed from a direction substantially perpendicular to the face of the first substrate side, red with a clear and dark coloring density is displayed. This coloring state is maintained even if the application of the voltage to the electrodes is stopped. Then, when an inverse voltage is applied to the display medium, the coloring of red disappears and white is displayed.

Red is displayed again under the same conditions as the above, and then the application of the voltage is stopped. The display medium is disassembled and subsequently the cross section of the penetration hole in the aluminum film is observed under a scanning electronic microscope (SEM) to affirm the deposition of a columnar metal with an aspect ratio of 3. Furthermore, the composition of the columnar metal deposited in the penetration hole is analyzed by means of an EDS (energy dispersive X-ray analyzer) to detect Au.

Example 2

—Production of a Display Medium—

A display medium having a construction similar to the display medium illustrated in FIG. 9 except that a polarizing plate is not disposed is produced in the following procedure.

First, as a first glass substrate, a glass substrate (length 30 mm×width 30 mm×thickness 5 mm) is prepared that periodically has disposed thereon a saw tooth-like uneven portion illustrated in FIG. 9 on one face, an ITO film with a thickness of 2 μm being further disposed on the saw tooth-like uneven surface. The saw tooth-like uneven portion, its top portion being linearly extended in the length direction of the glass substrate, is formed on one face of the first glass substrate in such a way that the top portion and valley portion (the border portion of two adjacent top portions) is repeated in the width direction (the right-hand to left-hand direction in FIG. 9). In addition, the uneven portion has two sides constituting the uneven portion (the sides corresponding to the symbols 104L, 104R in FIG. 9) that have a same length; each side takes an acute angle of 15 degrees to the face opposite to the face having disposed thereon the uneven portion; the width of one uneven portion (the length in the width direction of the substrate) is 50 μm.

Next, on the surface of the ITO film of the first substrate, aluminum is vapor deposited to form an aluminum film with a film thickness of 3 μm. Subsequently, the aluminum film is subjected to anodic oxidation treatment.

In the sample for observation prepared under the same conditions, the surface and cross section of the aluminum film after anodic oxidation treatment is confirmed under a scanning electron microscope (trade name: S4500, manufactured by Hitachi, Ltd.) to find formation of a large number of circular penetration holes reaching the ITO film surface from the aluminum film surface, in the aluminum film. The average hole diameter of the penetration holes formed in the aluminum film is 30 nm, the aspect ratio is 10, and the hole density is $4 \times 10^{10}$ holes/mm$^2$. In addition, the hole diameters of the penetration holes are each substantially the same, so the hole diameter distribution of the penetration holes is found to be substantially monodisperse.

Furthermore, about a half of all the penetration holes (i.e., the penetration holes positioned on one side of the uneven portion) are oriented in one direction and a residual half of the penetration holes (i.e., the penetration holes positioned on the other side of the uneven portion) are oriented in another direction; it is affirmed that the penetration holes are oriented in two directions. Additionally, in all the penetration holes, with the exception of the difference in orientation direction, its hole axis takes an angle of about 75 degrees with the face (reference face) of the first glass substrate opposite to the face thereof on which the ITO film is formed, so the hole axis angle is found to be 75 degrees.

Next, on the aluminum film surface having penetration holes is placed a Teflon (Registered Trademark) with a thickness of 1 mm as a spacer, and further thereon a second glass substrate (length 30 mm×width 30 mm×thickness 5 mm) having formed thereon an Au film with a film thickness of 1 μm as a counter electrode is placed such that the electrode face is faced to the aluminum film face to obtain a laminate consisting of a pair of substrates. At this time, an electrolytic solution is filled between the substrates. The electrolytic solution is prepared by dissolution of 10 mM of $KAuBr_4$ and 0.1 M of NaBr in a DMSO solvent.

Subsequently, the entire face of the laminate edge face is sealed with an ultraviolet curing resin, and then the resulting material is irradiated with an ultraviolet ray and cured to obtain a display medium. When the display medium is fabricated, a leading wire of an appropriate length is connected such that an electric current passes through the electrodes.

—Evaluation—

To the display medium obtained is flowed a direct current at a current density of 3 mA/cm$^2$ by use of an Au electrode as an anode and an ITO electrode as a cathode for a predetermined time as indicated below, and then the display medium is observed from a direction substantially perpendicular to the face of the first substrate side.

At first, (1) after the current is flowed for four seconds, red is displayed. Next, the inverse current is flowed between the electrodes until coloring state is completely extinguished, and then again by use of an Au electrode as an anode and an ITO electrode as a cathode, (2) the current is flowed for eight seconds, and then a red violet color is displayed. Thereafter, the inverse current is flowed between the electrodes until coloring state is completely extinguished, and then again by use of an Au electrode as an anode and an ITO electrode as a cathode (3) the current is flowed for 12 seconds, and then a dark red violet color is displayed.

The coloring density is found to be high in the cases (2) after the current is flowed for eight seconds and (3) after the current is flowed for 12 seconds, relative to (1) after the current is flowed for four seconds.

In each of the states (1) after the current is flowed for four seconds, (2) after the current is flowed for eight seconds and (3) after the current is flowed for 12 seconds, the display media are disassembled to observe the cross sections of the penetration holes in the aluminum films under a scanning electronic microscope and to check the aspect ratios of the metals deposited in the penetration holes. As a result, the aspect ratios are 1 (1) after the current is flowed for four seconds, 2 (2) after the current is flowed for eight seconds and 3 (3) after the current is flowed for 12 seconds. In addition, elemental analysis is carried out by means of an EDS as in Example 1 to affirm the deposition of Au in any cases.

Example 3

—Production of Display Medium—

A polarizing plate (trade name: Linear Polarixers, manufactured by Polarcor Corp.) is stuck and fixed to the face (reference face) of the first substrate side of the display medium produced in Example 2 such that, as in the case illustrated in FIG. 9, the polarized component in the direction parallel to the reference face and parallel to the direction in which the top portion of the saw tooth-like uneven portion and valley portion (border portion of two adjacent uneven portions) are repeated may be cut to obtain a display medium.

Next, when the display medium is evaluated as in Example 2, (1) after the current is flowed for four seconds, red is displayed, (2) after the current is flowed for eight seconds, violet is displayed, and (3) after the current is flowed for 12 seconds, a red violet color is displayed, so it is confirmed that a color different from the color displayed by the display medium of Example 2 is displayed even if display is carried out under the same conditions.

What is claimed is:

1. A display medium, comprising:
   a first substrate having transparency and provided with a transparent electrode on one face thereof;
   a member having a plurality of penetration holes, the member being placed on a surface of the transparent electrode, the penetration holes penetrating the member from the transparent electrode surface side, the ratio of the length of each of the penetration holes to the largest hole diameter being two or more;
   a second substrate placed so as to face the transparent electrode side of the first substrate;
   an electrolytic solution containing a metal ion and placed so as to fill a space between the first and second substrates; and
   a counter electrode placed in a position so as to be insulated from the transparent electrode and in contact with the electrolytic solution.

2. The display medium of claim 1, wherein the angle between a face of the first substrate opposite to the face thereof on which the transparent electrode is placed, and the hole axis of the penetration hole is within the range of from 0 degrees to less than 90 degrees.

3. The display medium of claim 1, wherein
   a part of the plurality of penetration holes are oriented in one direction and another part thereof are oriented in another direction, and
   the angle between the hole axis of the penetration holes oriented in the one direction and the hole axis of the penetration holes oriented in the another direction is 5 degrees or more.

4. The display medium of claim 1, wherein the plurality of penetration holes are all oriented in one direction.

5. The display medium of claim 1, wherein
   a part of the plurality of penetration holes are oriented in one direction and another part thereof are oriented in another direction, and
   the angle between the hole axis of the penetration holes oriented in the one direction and the hole axis of the penetration holes oriented in the another direction is in the range of from greater than 0 degrees to less than 5 degrees.

6. The display medium of claim 1, wherein a polarizing plate is placed in at least any position selected from between the first substrate and the transparent electrode, and on a face of the first substrate opposite to the face thereof on which the transparent electrode is placed.

7. The display medium of claim 1, wherein
   an image is displayed in at least one state selected from a first state in which a metal is not deposited in the penetration holes and a second state in which a metal is deposited in the penetration holes, and
   when displaying is carried out while an image to be displayed is changed, at every time when the changing from one image to another image is completed, in the case where the second state is selected in at least a part of the plurality of penetration holes, the ratio of the length in the hole axis direction of the penetration hole to the largest diameter of the metal deposited in the penetration hole is two or more.

8. The display medium of claim 1, further comprising an electric field controller that controls an electric field to be applied to the electrolytic solution so that, when image information is input, an image corresponding to the image information is displayed, wherein
   when image information is input to the electric field controller, according to the image information, at least one selected from (1) depositing a metal in a penetration hole by applying an electric field for reducing the metal ion to the electrolytic solution, and (2) dissolving a metal deposited in the penetration hole by applying an electric field for oxidizing the metal deposited in the penetration hole to the electrolytic solution is carried out, and
   when the displaying of the image corresponding to the image information is completed, at least one of the depositing or the dissolving is carried out so that at least one state is obtained, the state being selected from a state in which a metal is not deposited in a penetration hole and a state in which a metal is deposited in a penetration hole and the ratio of the length in the hole axis direction of the penetration hole to the largest diameter of the metal deposited in the penetration hole is two or more.

9. A display device, comprising:
   a first substrate having transparency and provided with a transparent electrode on one face thereof;
   a member having a plurality of penetration holes, the member being placed on a surface of the transparent electrode, the penetration holes penetrating the member from the transparent electrode surface side, the ratio of the length of each of the penetration holes to the largest hole diameter being two or more;
   a second substrate placed so as to face the transparent electrode side of the first substrate;
   an electrolytic solution containing a metal ion and placed so as to fill a space between the first and second substrates;
   a counter electrode placed in a position so as to be insulated from the transparent electrode and in contact with the electrolytic solution; and
   an electric field applying unit that is connected to the transparent electrode and the counter electrode and applies an electric field to the electrolytic solution.

10. A display method comprising displaying an image through depositing a columnar metal in a penetration hole in a member having a plurality of penetration holes, the member being placed on a surface of a transparent electrode of a substrate and in contact with an electrolytic solution containing a metal ion, the substrate having transparency and being provided with the transparent electrode on one face thereof, the penetration holes penetrating the member from the transparent electrode surface side, the ratio of the length of each of the penetration holes to the largest hole diameter being two or more, and the depositing being carried out by at least applying an electric field for reducing the metal ion to the electrolytic solution via the transparent electrode.

* * * * *